(12) United States Patent
Chen

(10) Patent No.: US 10,583,872 B1
(45) Date of Patent: Mar. 10, 2020

(54) FLOW ROLLERS

(71) Applicant: Hezhang Chen, Los Alamitos, CA (US)

(72) Inventor: Hezhang Chen, Los Alamitos, CA (US)

( * ) Notice: Subject to any disclaimer, the term of this patent is extended or adjusted under 35 U.S.C. 154(b) by 0 days.

(21) Appl. No.: 16/575,970

(22) Filed: Sep. 19, 2019

(51) Int. Cl.
*B62D 35/00* (2006.01)

(52) U.S. Cl.
CPC ................. *B62D 35/00* (2013.01)

(58) Field of Classification Search
CPC .......... B62D 35/00; B64C 23/00; B64C 23/06
USPC ............................................. 416/55
See application file for complete search history.

(56) References Cited

U.S. PATENT DOCUMENTS

| | | | |
|---|---|---|---|
| 1,674,169 A * | 6/1928 | Flettner | B63H 9/02 416/4 |
| 1,785,300 A | 12/1930 | De Tour Castelcicala | |
| 1,850,954 A * | 3/1932 | Berbeck | B64C 23/02 244/9 |
| 2,514,513 A | 7/1950 | Price | |
| 3,092,354 A | 6/1963 | Alvarez-Calderon | |
| 3,448,714 A | 6/1969 | Brooks | |
| 6,622,973 B2 | 9/2003 | Al-Garni | |
| 6,824,109 B2 | 11/2004 | Garver | |
| 9,394,046 B2 | 7/2016 | Garver | |
| 2006/0102801 A1 | 5/2006 | Manley | |
| 2016/0356805 A1 * | 12/2016 | Schneider | G01P 13/02 |

* cited by examiner

*Primary Examiner* — Richard A Edgar
*Assistant Examiner* — Maxime M Adjagbe
(74) *Attorney, Agent, or Firm* — Clement Cheng

(57) ABSTRACT

The present invention flow rollers are a moving surface boundary layer control method that can reduce surface friction in, automobiles, aircrafts, ships, high speed trains, launch vehicles, sound barriers, temperature barriers, and housings. In a moving surface airflow control system, a flow roller device for mounting on a vehicle for reducing fluid resistance has a first elongated rotating body mounted on a first axis of rotation. The first axis of rotation defines a first forward portion and a first rear portion. The first forward portion is in front of the first axis of rotation, and the first rear portion is behind the first axis of rotation. The first forward portion is configured to move with the fluid flow in a direction along a longitudinal midline and rotate with the airflow.

15 Claims, 7 Drawing Sheets

FLOW ROLLERS

FIELD OF THE INVENTION

The present invention is in the field of moving surface boundary layer control methods.

DISCUSSION OF RELATED ART

A variety of different moving surface boundary layer control methods have been described in the prior art. Some of these moving surface boundary layer control methods have centered around a rotating cylinder at a leading edge or trailing edge of an airfoil.

For example, in U.S. Pat. No. 1,674,169, Arrangement For Exchanging Energy Between A Current And A Body Therein by inventor Flettner Anton, published Jun. 19, 1928 the abstract discloses a conveyor belt surface that decreases air friction. A conveyor belt surface is also shown in U.S. Pat. No. 1,785,300, Rolling Apron For Airplane Wings by inventor Castelcicala Filiberto De Tour, published Dec. 16, 1930.

Another conveyor belt plane wing is shown in U.S. Pat. No. 6,622,973, Movable Surface Plane by inventor Ahmed Z. Al-Garni et al., published Sep. 23, 2003 the abstract discloses, "Movable surface planes include opposed independently movable endless surfaces over the majority of opposite sides of the planes. By moving one surface in the same direction as the fluid flow about the plane, and the opposite surface in a direction opposite the fluid flow, the flow is accelerated across the surface moving in the same direction to produce a lesser pressure, and retarded across the surface moving in the opposite direction to produce a greater pressure. The net result is a force urging the plane toward the surface moving in the direction of ambient fluid flow. The two surfaces of the present invention may be operated independently of one another, to move in the same or opposite directions and to have the same or different velocities. The movable surfaces are porous and communicate with ductwork within the structure, to provide fluid flow through the surfaces for boundary layer control."

Sometimes the belt plane wing encompasses the entire wing. For example, in the U.S. Pat. No. 9,394,046, Fluid Interface Device As Well As Apparatus And Methods Including Same by inventor Theodore M. Garver, published Jul. 19, 2016 the abstract discloses, "A fluid interface device, such as an airfoil assembly, can include a device structure and at least one movable band oriented such that the band moves in a direction of fluid flow. The at least one movable band can be supported on the device structure such that an outer surface of the movable band is exposed along the device structure and is capable of movement relative thereto such that a relative velocity can be maintained between the outer surface and the device structure. The fluid interface device can also include an edge extension disposed along the leading edge of the device structure. An airplane, a wind turbine and a method are also included."

For example, in the U.S. Pat. No. 6,824,109, Lift Adjusting Device For Aircraft by inventor Theodore Garver, published Nov. 30, 2004 the abstract discloses, "The invention utilizes a computer-controlled moving band, typically on an airplane, to increase the apparent speed and therefore the lift of any body moving through a fluid. The invention will allow greater precision of control. One benefit is that take-offs and landings can be carried at reduced speeds and with greater loads. This control will also adjust boundary layer to adjust drag thereby allowing more flexibility in wing design."

In U.S. Pat. No. 3,092,354, Aerodynamic System And Apparatus by inventor Alvarez-Calderon Alberto, published Jun. 4, 1963 discloses a revolving cylinder that decreases air friction on a folding airplane wing. Also, in U.S. Pat. No. 3,448,714, Fin And Revolving Cylinder Bidirectional Steering Actuator by inventor John D Brooks, published Jun. 10, 1969 the specification discloses a leading and trailing edge revolving cylinder on a foil.

Airflow can also control boundary layers and drag. For example, in U.S. Pat. No. 2,514,513 Jet Power Plant With Boundary Layer Control For Aircraft by inventor Nathan C Price, published Jul. 11, 1950 the specification also discloses moving surfaces that decrease air friction. Also for example, in United States publication number 2006/60102801, High-Lift Distributed Active Flow Control System And Method by inventor David Manley, published May 18, 2006 the abstract discloses, "The present invention is directed to a distributed active flow control ("DAFC") system that maintains attached airflow over a highly cambered airfoil employed by an aircraft or other similar applications. The DAFC system includes a primary power source comprised of one or more aircraft engines, one or more power conversion units, and optionally, one or more auxiliary power units. The power conversion units are coupled to one or more aircraft engines for supplying power to a distribution network. The distribution network disperses power from the one or more power conversion units to active flow control units disposed within one or more aircraft flight control surfaces (e.g., the aircraft wing, the tail, the flaps, the slats, the ailerons, and the like). In one embodiment, an auxiliary power unit is included for providing a redundant and auxiliary power supply to the distribution network. In another embodiment, a back-up power source is provided in communication with the distribution network for providing an additional redundant power supply."

The flow rollers can be installed in or built into a structure of the surface of a vehicle. A nose portion part, in hydrodynamic or aerodynamic vehicles such as cars, airplanes, ships, high-speed rails, launch vehicles can retrofit the original fixed casing to provide a rotatable moving surface and thereby reduce relative speed. Speed, that is, it has sliding friction, which becomes a form of rolling friction, thereby greatly reducing the air or water resistance when these vehicles are traveling, increasing the driving speed, saving energy, and reducing emissions.

Shape change can also lead to decreased drag. For example, in the U.S. Pat. No. 5,590,854, Movable Sheet For Laminar Flow And Deicing by inventor Solomon Shatz, published Jan. 7, 1997 the abstract discloses, "A movable sheet overlying a wing is disclosed that creates laminar flow over its exposed surface. The movable sheet serves as an integral, retractable shield for protecting a suction support structure of a wing against contamination, and also serves as a movable, conductive substrate for deicing by means of electrical resistance or hot-gas heating. The invention includes a movable sheet that is mounted scroll-like on two motor-driven rollers. The sheet has a solid area without perforations that protects the suction support structure from contamination, and a porous area with perforations therethrough that allows boundary layer suction. The motor-driven rollers scroll the sheet to cover the suction support structure with either the solid area or the perforations of the sheet. Contact rollers at the edge of the sheet supply electrical current to resistively heat the sheet and melt any accumulated ice. The movable sheet can also be moved back and forth to dislodge the ice."

SUMMARY OF THE INVENTION

The present invention flow rollers are a moving surface boundary layer control method that can reduce surface friction in, automobiles, aircrafts, ships, high speed trains, launch vehicles, sound barriers, temperature barriers, and housings. In a moving surface airflow control system, a flow roller device for mounting on a vehicle for reducing fluid resistance has a first elongated rotating body mounted on a first axis of rotation. The first axis of rotation defines a first forward portion and a first rear portion. The first forward portion is in front of the first axis of rotation, and the first rear portion is behind the first axis of rotation. The first forward portion is configured to move with the fluid flow in a direction along a longitudinal midline and rotate with the airflow.

A second elongated rotating body mounted on a second axis of rotation. The second axis of rotation defines a second forward portion and a second rear portion. The second forward portion is in front of the second axis of rotation, and the second rear portion is behind the second axis of rotation. The second forward portion is configured to move forward and rotate with the fluid flow.

A frame is configured with a rotating mount to the first elongated rotating body and to the second elongated rotating body. A first intermediate vane extends between the first elongated rotating body and the second elongated rotating body. The first intermediate vane has a first intermediate vane leading edge configured to conform to a profile of the first elongated rotating body. The first intermediate vane has a trailing edge configured to conform to a profile of the second elongated rotating body.

The first axis of rotation and the second axis of rotation define a roller axle line. The longitudinal midline attack angle makes an attack angle with the roller axle line. The first elongated rotating body is formed as a flow roller that is not cylindrical. The first elongated rotating body is formed as a flow roller that is barrel shaped with a larger radius near the middle of the first elongated rotating body. The first elongated rotating body is formed as a composite surface composed of two or more differently shaped surfaces. A third elongated rotating body is mounted on a third axis of rotation.

The third axis of rotation defines a third forward portion and a third rear portion. The third forward portion is in front of the third axis of rotation, and the third rear portion is behind the third axis of rotation. The third forward portion is configured to move in a forward direction. The frame is further configured with a rotating mount to the third elongated rotating body; and a second intermediate vane extending between the second elongated rotating body and the third elongated rotating body, the second intermediate vane has a second intermediate vane leading edge configured to conform to a profile of the second elongated rotating body, and the second intermediate vane has a trailing edge configured to conform to a profile of the third elongated rotating body.

A fourth elongated rotating body is mounted on a fourth axis of rotation. The fourth axis of rotation defines a fourth forward portion and a fourth rear portion. The fourth forward portion is in front of the fourth axis of rotation, and the fourth rear portion is behind the fourth axis of rotation. The fourth forward portion is configured to move forward and rotate with the airflow. The frame is further configured with a rotating mount to the fourth elongated rotating body. A third intermediate vane extend between the third elongated rotating body and the fourth elongated rotating body. The third intermediate vane has a third intermediate vane leading edge configured to conform to a profile of the third elongated rotating body. The third intermediate vane has a trailing edge configured to conform to a profile of the fourth elongated rotating body.

A fifth elongated rotating body is mounted on a fifth axis of rotation. The fifth axis of rotation defines a fifth forward portion and a fifth rear portion. The fifth forward portion is in front of the fifth axis of rotation. The fifth rear portion is behind the fifth axis of rotation. The fifth forward portion is configured to move forward and rotate with the airflow. The frame is further configured with a rotating mount to the fifth elongated rotating body. A fourth intermediate vane extending between the fourth elongated rotating body and the fifth elongated rotating body. The fourth intermediate vane has a fourth intermediate vane leading edge configured to conform to a profile of the fourth elongated rotating body. The fourth intermediate vane has a trailing edge configured to conform to a profile of the fifth elongated rotating body.

The first elongated rotating body, the second elongated rotating body, the third elongated rotating body, the fourth elongated rotating body, the fifth elongated rotating body form a relatively flat surface with the first intermediate vane, the second intermediate vane, the third intermediate vane and the fourth intermediate vane form a roller array with a relatively flat surface of alternating rollers and vanes.

The motor powers the first elongated rotating body for further minimizing drag.

The motor is configured to generate power from first elongated rotating body when increasing drag. The first elongated rotating body and the second elongated rotating body are both mounted on low friction ceramic bearings. The vanes can be planar or not planar.

It is the primary object of the present invention to improve environmental quality and conserve energy. The apparatus reduces fossil fuel emissions and reduces fuel consumption in vehicles such as cars, trucks and boats.

The following call out list of elements can be a useful guide in referencing the elements of the drawings.

19 Vehicle
21 Ground
22 Low Friction Wheel
23 Carriage
24 Roller Array
25 Roller Cover
26 Intermediate Vane Array
27 Water Spray
28 Water Nozzle
29 Water Valve
30 Water Array Line 31 Anchor
32 Measurement Scale
33 Anchor Line
34 Roller Axle
35 Attack Angle
36 Exposed Leading Portion Of Roller Surface
37 Exposed Trailing Portion Roller Surface
38 Carriage Frame
40 Roller
41 First Roller
42 Second Roller
43 Third Roller
44 Fourth Roller
45 Fifth Roller
46 Sixth Roller
47 Seventh Roller
48 Nth Roller
50 Intermediate Vane
51 First Intermediate Vane
52 Second Intermediate Vane
53 Third Intermediate Vane
54 Fourth Intermediate Vane
55 Fifth Intermediate Vane
56 Sixth Intermediate Vane
57 Seventh Intermediate Vane
58 Nth Intermediate Vane
61 Longitudinal Midline
70 Roller Mid Line
71 First Roller Midline
72 Second Roller Midline
73 Third Roller Midline
74 Fourth Roller Midline
75 Fifth Roller Midline
76 Sixth Roller Midline
77 Seventh Roller Midline
78 Nth Roller Midline
80 Vane Body
81 Vane Leading Edge
82 Vane Trailing Edge
84 Vane Left Edge
85 Vane Right Edge
86 Vane Leading Edge Overlap
87 Rotation Direction
88 Roller Front
89 Roller Rear
90 Roller Axis
91 Motor
92 Housing
93 Housing Front Edge
94 Housing Ridge
95 Roller Axle Line
I Starting Line
II Ending Line
A Point Receiving Sliding Friction Coefficient From Airflow
A Beginning Location
B Ending Location
N Normal Force Component

DETAILED DESCRIPTION OF THE PREFERRED EMBODIMENT

Figure 1:
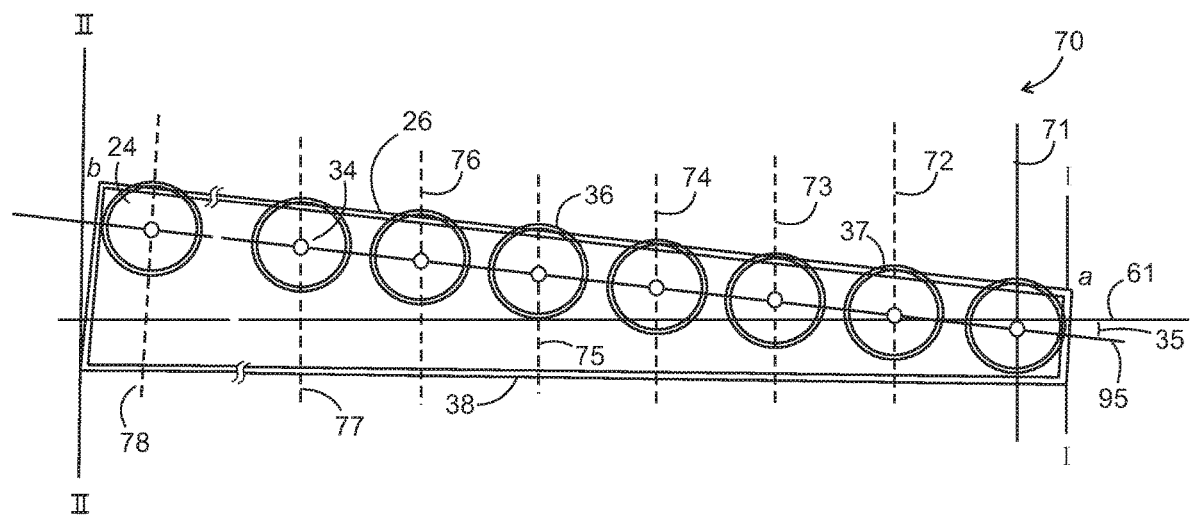
FIG. 1 is a cross-section diagram of the present invention showing the roller arragement.

As seen in FIG. 1, a series of rollers 24 are mounted on roller axles 34. The series of rollers 24 are preferably aligned to an attack angle 35 of the series of rollers 24. The attack angle can be defined on an airfoil, or preferably a nose of a vehicle. The exposed leading portion of the roller surface 36 is greater than the exposed trailing portion of the roller surface 37. The device can be a series of rollers that are retained on a carriage frame 38. The carriage frame 38 could be externally mounted to the vehicle or can be integrally formed with the surface of the vehicle.

As the vehicle travels through the air, the rollers 24 push aside the air. The exposed portion of the rollers appears between intermediate vanes formed between the rollers. The intermediate vanes form an intermediate vane array 26 between each successive set of rollers. The roller axles 34 can be linearly arranged to form a roller axle line and define an attack angle 35 between the roller axle line and the longitudinal midline 61. The attack angle 35 exposes the roller surface. An exposed leading portion of a roller surface 36 is greater than an exposed trailing portion of a roller surface 37.

The roller 34 has a roller midline 70 passing through the roller axles 34 so as to define the roller into a forward half and a rear half. The forward half of the roller 34 has an exposed leading portion of the roller surface 36 and the rear half of the roller 34 has an exposed portion tailing roller surface 37. Each roller has a roller midline 70 including a first roller midline 71, a second roller midline 72, a third roller midline 73, a fourth roller midline 74, a fifth roller midline 75, a sixth roller midline 76, a seventh roller midline 77, and an Nth roller midline 78. Therefore, each roller has an exposed trailing portion of the roller surface 37 and an exposed leading portion of the roller surface 36.

The carriage frame 38 can partially enclose the rollers and act as a housing for them. The carriage frame 38 can be modularly implemented on a vehicle surface such as by fitting into the recesses of a vehicle. The modular implementation of the carriage frame 38 allows for replacement if necessary.

Figure 2:
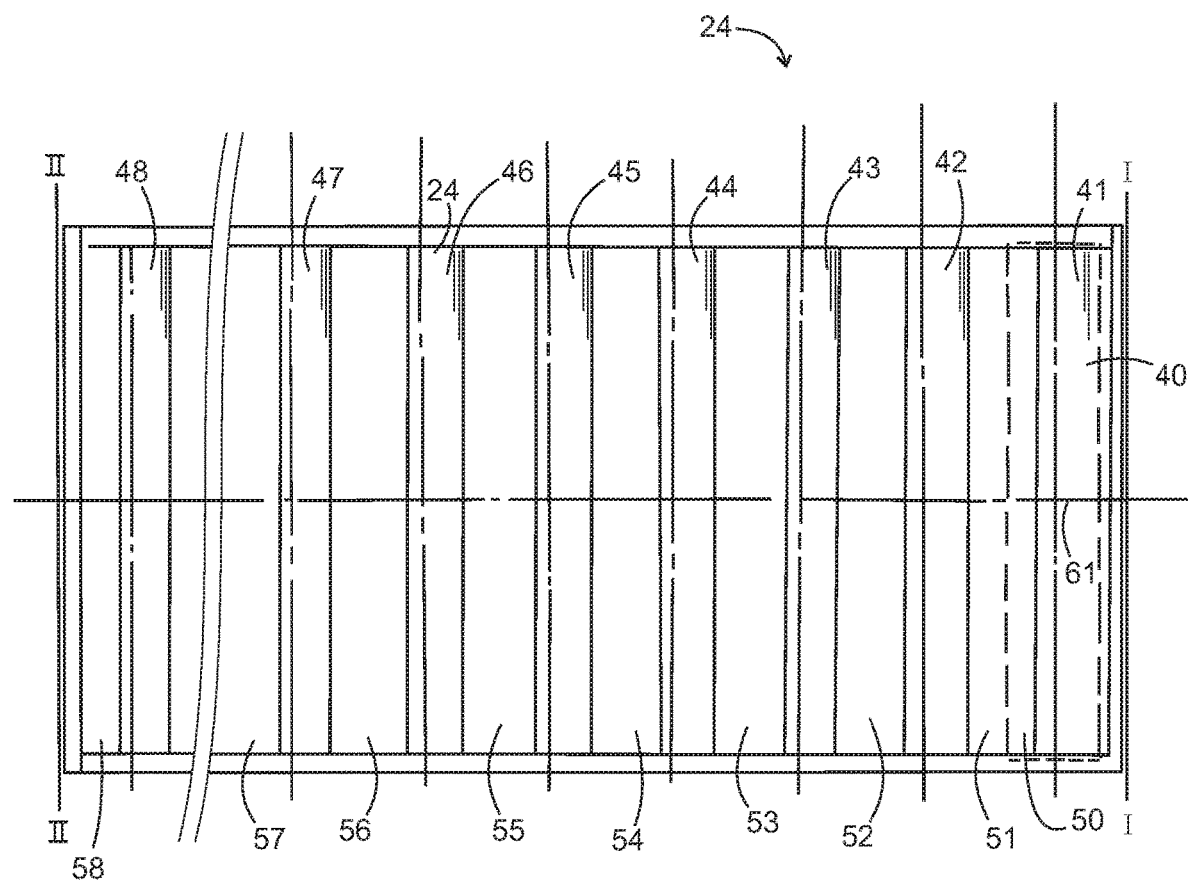
FIG. 2 is a top view of the present invention.

As seen in FIG. 2, a top view diagram shows that the alternating rollers 34 and intermediate vanes 50 make an undulating surface that maintains a continuous flow of air. A roller array 24 has rollers 40 including a first roller 41, a second roller 42, a third roller 43, a fourth roller 44, a fifth roller 45, a sixth roller 46, a seventh roller 47, and an Nth roller 48. Between the rollers 34 are intermediate vanes 50. A first intermediate vane 51 is between the first roller 41 and the second roller 42. A second intermediate vane 53 is between the second roller 42 and the third roller 43. The pattern continues with the third intermediate vane 53, the fourth intermediate vane 54, the fifth intermediate vane 55, the sixth intermediate vane 56, the seventh intermediate vane 57 and up to an Nth intermediate vane 57. Preferably, the rollers and intermediate vanes are arranged along the longitudinal mid line 61.

Figure 3:
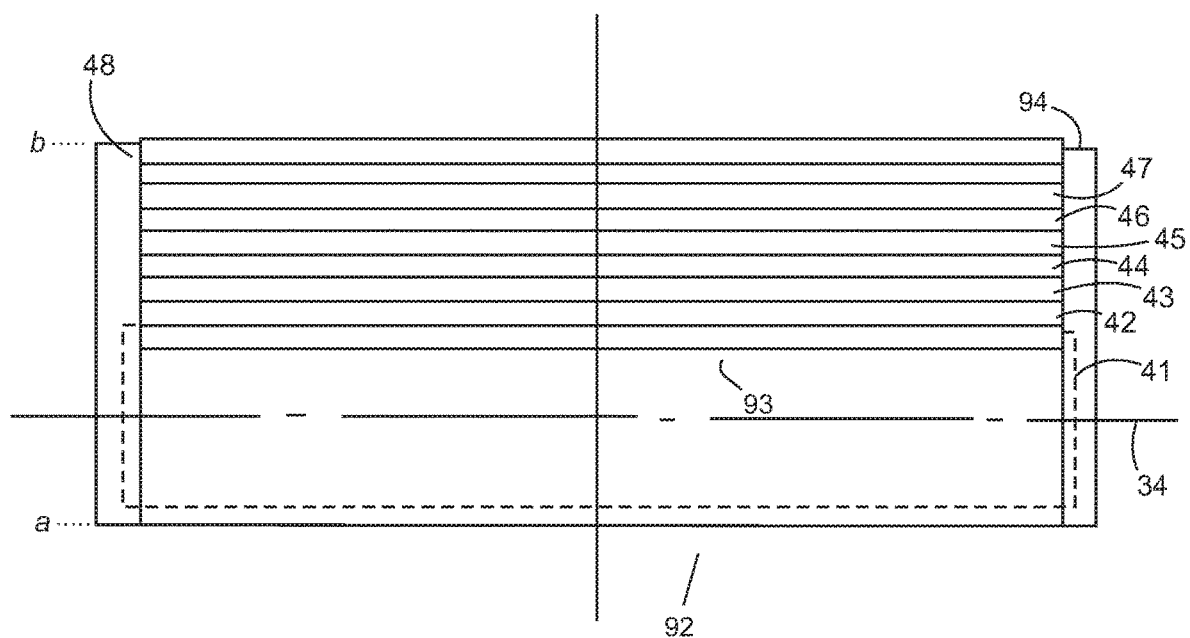
FIG. 3 is a front view of the present invention.

As seen in FIG. 3, the starting line I can be defined as the housing front edge 93, and the ending line II can be defined as the housing rear edge 94. The first roller 41 has an upper portion that is exposed and from the front plan view, obscures the first intermediate vane 51. The second roller 42 is set at a height higher than the first roller 41. The second roller 42 obscures the second intermediate vane 52 in a front plan view. Successive rollers including the third roller 43, the fourth roller 44, the fifth roller 45, the sixth roller 46 and the seventh roller 47 up to the Nth roller 48 successively raise the airflow. As airflow passes over the rollers, the rollers rotate and maintain rotation which allows airflow to pass along the array of rollers like a series of undulating steps. The intermediate vanes are preferably sized so that they minimize additional generated turbulence between the rollers. The airflow thus takes the profile and flow of a curtain. Instead of airflow, the apparatus can be used for water flow as well on a ship bow.

Figure 4:
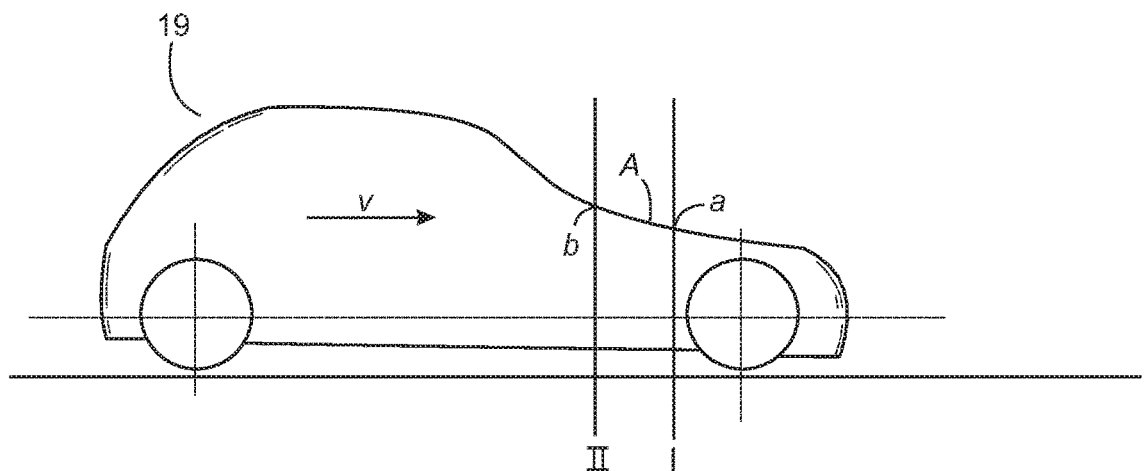
FIG. 4 is a diagram of a vehicle in motion.
Figure 6:
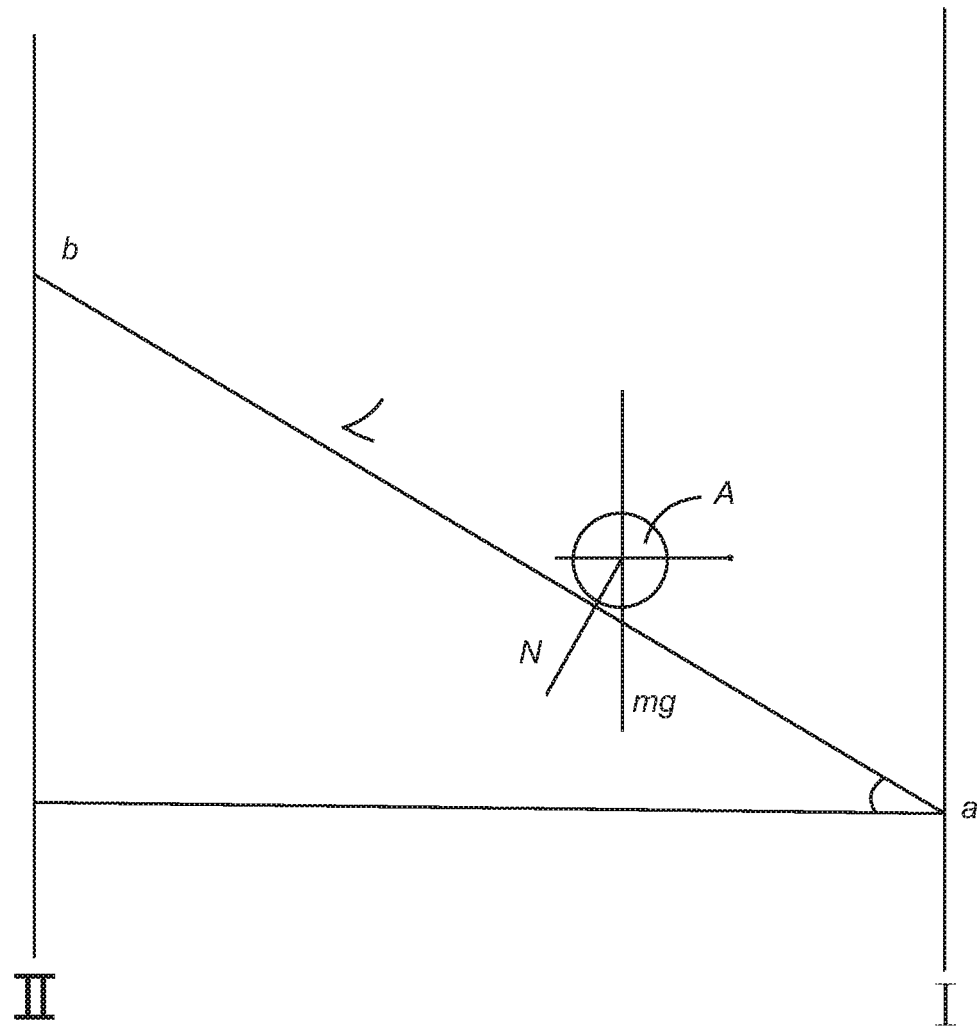
FIG. 6 is a force diagram showing force vectors on a roller.

As seen in FIG. 4, a force diagram of a vehicle 19 such as a car shows that the starting line I and the ending line II can be defined on a vehicle surface such as if the rollers were mounted to a car surface. The sliding friction coefficient from airflow at point A is continuous as it passes from the beginning location a to the ending location b. The rolling friction is less than the sliding friction, so the portion of the roller exposed to airflow decreases air resistance. As seen in FIG. 6, a length L can be defined from the beginning location a to the ending location b.

The sliding friction coefficient A generates a force from the airflow has a normal force component N that is added to a weight of a roller that can be expressed in milligrams mg. The present invention can have an overall air resistance lower than typical moving surface cylinders because the present invention uses a cascade or array of rollers. Each roller successively moves the airflow and manages the direction of the airflow. By alternating rollers and vanes to make small steps of change of airflow in a cascade shape at an optimal angle of attack, the present invention improves the air handling over traditional moving surface cylinders or belts. This can also decrease vehicle skin temperature.

Figure 5:
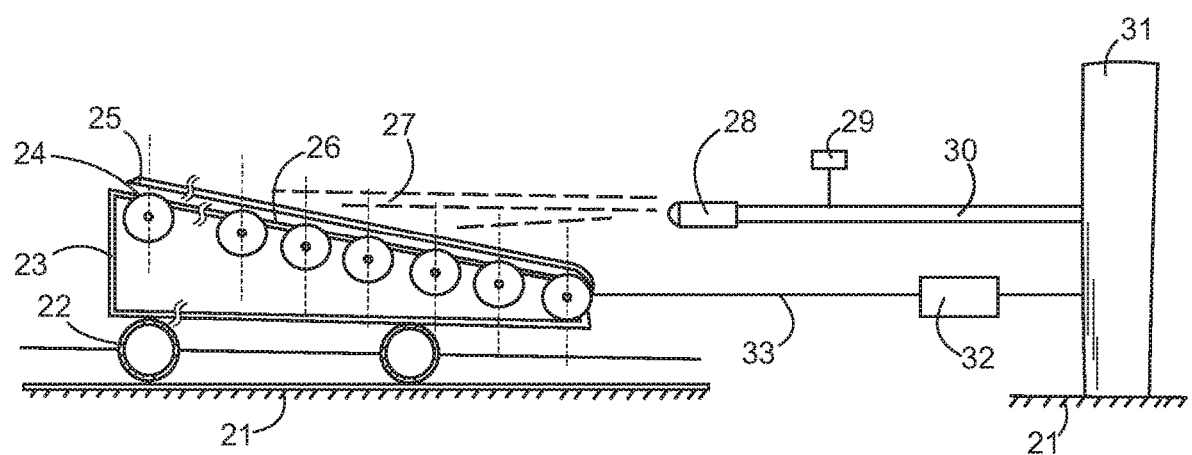
FIG. 5 is a diagram of a testing bed.

As seen in FIG. 5, a test carriage 23 can be used for determining optimum intermediate vane 26 configuration. The ground 21 is a low friction surface such as glass. A low friction wheel 22 can be made using cylinders or other smooth low friction rolling surfaces. The carriage 23 can have multiple rollers 24. The array of rollers 24 can be covered by a roller cover 25. The roller cover 25 can be made of a sheet of metal to allow a comparison between the drag of the test carriage 23 with and without the roller cover 25 to provide a control for the experiment. The angle of the intermediate vanes 26 receiving the water spray 27 are optionally adjustable. The water spray 27 emanates from a water nozzle 28 that is secured by a water nozzle retainer. A water valve 29 can control flow of the water nozzle 28. Preferably, the water spray line 30 is connected to an anchor 11 such as a wall. The force reaction of the test carriage 23 in a roller cover 25 configuration and a roller 24 configuration can be tested with an anchor line 33 and a measurement scale 32. Because the anchor line 33 and the test scale 32 are connected to the anchor 11 such as a wall, the test carriage 23 can be used to test the optimal configuration of the vanes and rollers. The test carriage 23 after testing can provide an optimal angle of attack, and roller and intermediate vane configuration.

Figure 7:
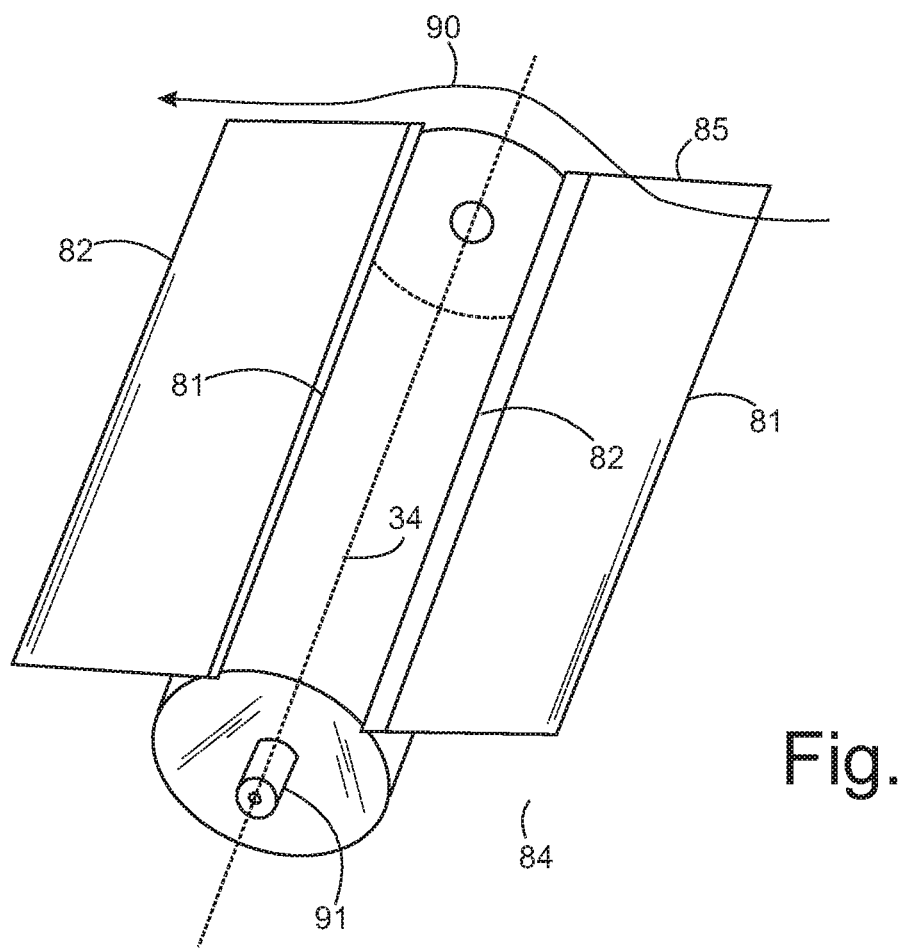
FIG. 7 is a diagram showing a motorized roller unit.

As seen in FIG. 7, a roller has a roller axle 34 on a roller axis 90. The roller axle 34 can be powered by a motor 91 such as a regenerative electrical motor. The motor 91 can rotate the roller with the airflow to lower air resistance, and the motor 91 can be powered by the airflow in a regeneration mode. Areas directed to the roller by a vane with a vane leading edge 81, a vane trailing edge 82, a vane left edge 84, and a vane right edge 85. The vane angle 83 may not be the same angle as the angle of attack. Preferably, the vane angle 83 is upturned so that the vane leading edge 81 is at a similar height as the vane trailing edge 82 when the rollers are increasing in height from the first roller to the Nth or last roller.

Figure 8:
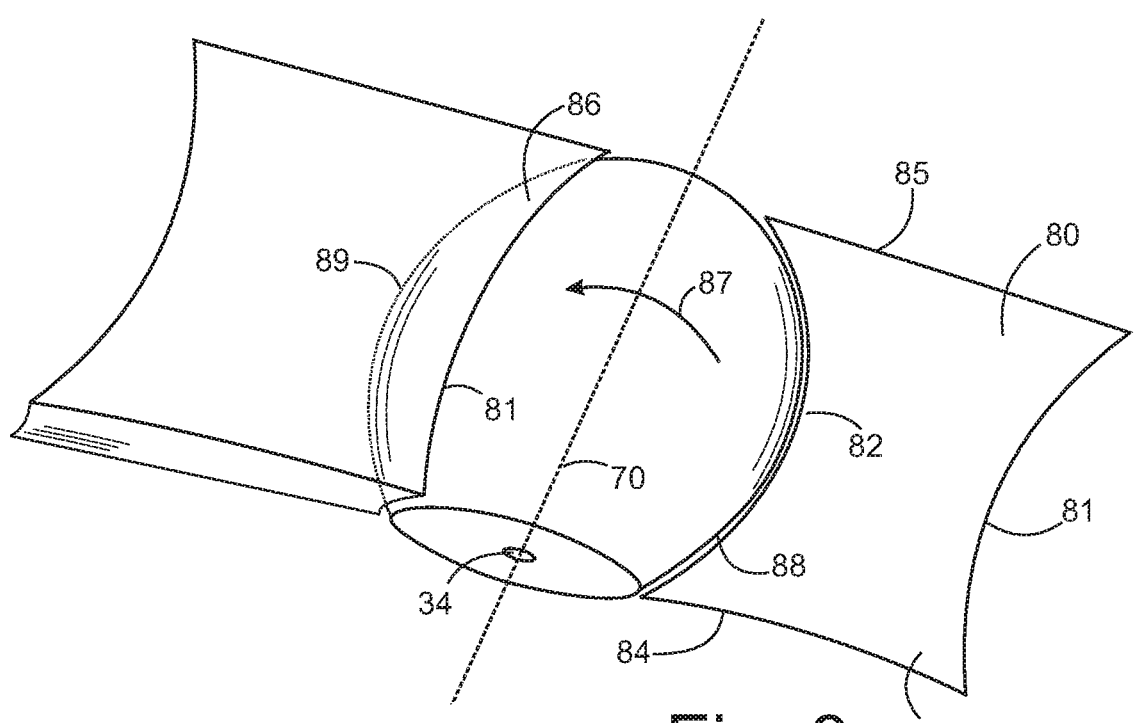
FIG. 8 is a diagram showing a barrel shaped roller.

As seen in FIG. 8, a roller can be formed in a barrel shape and mounted on a ceramic bearing for the roller axle 34. The barrel shape roller has a larger diameter in the middle than the ends. The barrel shape roller can be installed in a nose area of a vehicle to provide improved aerodynamics over a cylindrical roller. The roller midline 70 is coincident to the roller axle 34. A shaped vane body 80 is shaped to conform to the barrel shape of the roller. The shaped vane body 80 has a curved vane leading edge 81, and a vane trailing edge 82. Successive rollers from the barrel shaped roller should also have a barrel shape, although the shape of each successive roller can change slightly. A barrel shaped roller could be followed by successive rollers until an Nth roller is cylindrical for example. The vane left edge 84 and the vane right edge 85 could be straight even though the curved vane leading edge 81 and curved vane trailing edge 82 are not straight. The vane leading edge 81 overlaps and covers a substantial portion of the rear half of the roller at a vane leading edge overlap 86. The rotation direction 87 defines a roller front 88 and a roller rear 89. As airflow passes over the barrel shape roller, the differential in airspeed between the wide and narrow portions can be mitigated if the vane body 80 is curved such that it is not flat. The vane body 80 could be made of a panel, or a thicker object such as a frame.

The apparatus in FIG. 7 can be connected to the apparatus in FIG. 8 so that the first roller has a composite shape of a cylinder and a barrel together. In this case, barrel can have the same axis of rotation as the cylinder. Each successive roller can change in shape from the previous roller so that the roller shapes can match a surface profile of a vehicle.

The rollers can be made of sheet aluminum or tubes such that they are tube, hollow cylinder or can shaped. The rollers are on axles and the axles can line up to form a roller axle line 95. The roller axle line 95 preferably has an optimal angle of attack to the forward direction. The rollers can be mounted to ceramic bearings. The rollers can be motorized to charge a battery in a regenerative mode and rotate in the direction of airflow to minimize startup drag.

Figure 9:
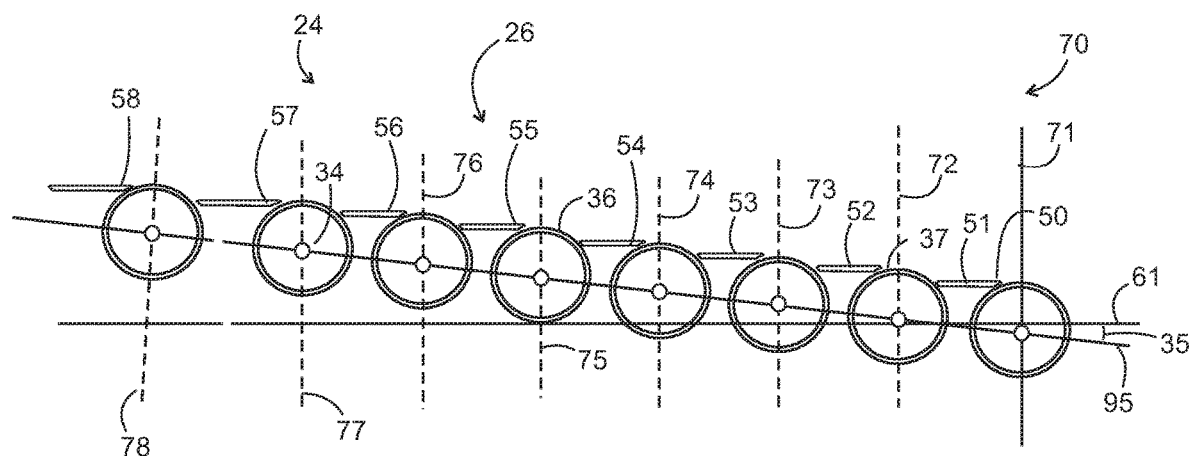
FIG. 9 is a cross-section diagram of the present invention showing the vane arrangement.

FIG. 9 is a cross-section diagram of the present invention showing the vane arrangement. As can be seen from the drawing, the vanes are preferably parallel to the direction of travel which is parallel to the longitudinal midline 61. Although the vanes travel in a generally parallel direction to the airflow, the rollers step up sequentially to provide a stepped angle. The stepped angle shape maintains low friction airflow over the entire roller array 24.

The invention claimed is:

1. A flow roller device for mounting for reducing fluid resistance comprising:
   a. a first elongated rotating body mounted on a first axis of rotation, wherein the first axis of rotation defines a first forward portion and a first rear portion, wherein the first forward portion is in front of the first axis of rotation, and wherein the first rear portion is behind the first axis of rotation, wherein the first forward portion is configured to move forward in a direction toward a longitudinal midline;
   b. a second elongated rotating body mounted on a second axis of rotation, wherein the second axis of rotation defines a second forward portion and a second rear portion, wherein the second forward portion is in front of the second axis of rotation, and wherein the second rear portion is behind the second axis of rotation, wherein the second forward portion is configured to move in a forward direction;
   c. a frame configured with a rotating mount to the first elongated rotating body and to the second elongated rotating body; and
   d. a first intermediate vane extending between the first elongated rotating body and the second elongated rotating body, wherein the first intermediate vane has a first intermediate vane leading edge configured to conform to a profile of the first elongated rotating body, and wherein the first intermediate vane has a trailing edge configured to conform to a profile of the second elongated rotating body, wherein the first intermediate vane covers a portion of the first elongated rotating body and a portion of the second elongated rotating body, wherein the first axis of rotation and the second axis of rotation define a roller axle line, wherein the longitudinal midline makes an attack angle with the roller axle line, wherein the attack angle is not zero, wherein the first intermediate vane does not move along with fluid flow.

2. The flow roller device of claim 1, wherein the first elongated rotating body is formed as a flow roller that is not cylindrical.

3. The flow roller device of claim 1, wherein the first elongated rotating body is formed as a flow roller that is barrel shaped with a larger radius near the middle of the first elongated rotating body.

4. The flow roller device of claim 1, wherein the first elongated rotating body is formed as a composite surface composed of two or more differently shaped surfaces.

5. The flow roller device of claim 1, further including a third elongated rotating body mounted on a third axis of rotation, wherein the third axis of rotation defines a third forward portion and a third rear portion, wherein the third forward portion is in front of the third axis of rotation, and wherein the third rear portion is behind the third axis of a rotation, wherein the third forward portion is configured to move with the airflow; wherein the frame is further configured with a rotating mount to the third elongated rotating body; and a second intermediate vane extending between the second elongated rotating body and the third elongated rotating body, wherein the second intermediate vane has a second intermediate vane leading edge configured to conform to a profile of the second elongated rotating body, and wherein the second intermediate vane has a trailing edge configured to conform to a profile of the third elongated rotating body, wherein the second intermediate vane covers a portion of the second elongated rotating body and a portion of the third elongated rotating body, wherein the second intermediate vane makes a second intermediate vane attack angle with the roller axle line, wherein the second intermediate vane attack angle is not zero.

6. The flow roller device of claim 5, further including a fourth elongated rotating body mounted on a fourth axis of rotation, wherein the fourth axis of rotation defines a fourth forward portion and a fourth rear portion, wherein the fourth forward portion is in front of the fourth axis of rotation, and wherein the fourth rear portion is behind the fourth axis of rotation, wherein the fourth forward portion is configured to move forward; wherein the frame is further configured with a rotating mount to the fourth elongated rotating body; and a third intermediate vane extending between the third elongated rotating body and the fourth elongated rotating body, wherein the third intermediate vane has a third intermediate vane leading edge configured to conform to a profile of the third elongated rotating body, and wherein the third intermediate vane has a trailing edge configured to conform to a profile of the fourth elongated rotating body, wherein the third intermediate vane covers a portion of the third elongated rotating body and a portion of the fourth elongated rotating body.

7. The flow roller device of claim 6, further including a fifth elongated rotating body mounted on a fifth axis of rotation, wherein the fifth axis of rotation defines a fifth forward portion and a fifth rear portion, wherein the fifth forward portion is in front of the fifth axis of rotation, and wherein the fifth rear portion is behind the fifth axis of rotation, wherein the fifth forward portion is configured to move forward; wherein the frame is further configured with a rotating mount to the fifth elongated rotating body; and a fourth intermediate vane extending between the fourth elongated rotating body and the fifth elongated rotating body, wherein the fourth intermediate vane has a fourth intermediate vane leading edge configured to conform to a profile of the fourth elongated rotating body, and wherein the fourth intermediate vane has a trailing edge configured to conform to a profile of the fifth elongated rotating body, wherein the fourth intermediate vane covers a portion of the fourth elongated rotating body and a portion of the fifth elongated rotating body.

8. The flow roller device of claim 7, wherein the first elongated rotating body, the second elongated rotating body, the third elongated rotating body, the fourth elongated rotating body, and the fifth elongated rotating body form a relatively flat surface with the first intermediate vane, the second intermediate vane, the third intermediate vane and the fourth intermediate vane form a roller array with a relatively flat surface of alternating rollers and vanes.

9. The flow roller device of claim 1, further including a motor, wherein the motor powers the first elongated rotating body for further minimizing drag.

10. The flow roller device of claim 8, wherein the motor is configured to generate power from first elongated rotating body when increasing drag.

11. The flow roller device of claim 1, wherein the first elongated rotating body and the second elongated rotating body are both mounted on low friction ceramic bearings.

12. The flow roller device of claim 1, wherein the vanes are planar.

13. The flow roller device of claim 1, wherein the vanes are not planar.

14. The flow roller device of claim 1, wherein the first intermediate vane is parallel to the longitudinal midline.

15. The flow roller device of claim 7, wherein the intermediate vanes are parallel to a direction of travel which is parallel to the longitudinal midline.

* * * * *